Patented Feb. 2, 1954

2,668,136

UNITED STATES PATENT OFFICE 2,668,136

TETRADECYLAMINE SALT OF O-PHENYLPHENOL

Joseph Winkler, New York, N. Y., assignor to By-Products Processing Laboratories, Inc., a corporation of New York No Drawing. Application August 2, 1951, Serial No. 240,063

2 Claims. (Cl. 167—58)

The present invention is dependent upon the heretofore unknown and surprisingly very high antimicrobial properties of the class of chemical compounds which can be characterized as: aryl-, substituted phenates of an aliphatic primary amine, having the following general symbolic formula:

$$Ar\text{-}C_6H_4\text{---}OH.R_1CH_2NH_2$$

where $R_1$ is a saturated or unsaturated aliphatic radical of the general structure:

$$C_nH_{2n+1} \text{ or } C_nH_{2n-1}$$

and Ar- is an aromatic ring radical of the general structure:

$$C_6H_5\text{---}$$

it has been found that the cheapest, least odoriferous and of the lowest toxicity is the anionic compound in which Ar- is a benzene ring in ortho position, thus defining the particular anionic compound as:

Ortho-$C_6H_5$---$C_6H_4$---OH (ortho-phenyl-phenol)

With alkyl-, or aryl-, substituted phenates of an aliphatic primary amine as one of the elements of the present compounds, a second element is combined. For this purpose I have found that any primary aliphaic amine where the number of carbon atoms is more than 4 and less than 21 can be used. But again from the point of its best antimicrobial activity, it has been found that a primary aliphatic amine with 14 carbon atoms or the so-called tetradecyl amine $$CH_3(CH_2)_{12}CH_2NH_2$$

is the best.

I have discovered that the most satisfactory germicide and disinfectant compound from the above discovered chemical group may be defined as tetradecylamine-ortho-phenyl-phenate having the following formula $$o\text{-}C_6H_5\text{---}C_6H_4OH.2HNCH_2(CH_2)_{12}CH_3$$

which I have synthesized in the following way:

EXAMPLE 213 grams of a purified grade of tetradecylamine are melted and heated to a temperature of about 40° C. Into this warm liquid, 170 grams of purified grade of ortho-phenyl-phenol in crystal form are slowly mixed in while stirring. A reaction takes place whereby the temperature of the mixed ingredients rises. By proper cooling, the temperature is held at about 40° C. After about ten minutes of mixing, a new slightly pinkish colored compound results, which is a clear oily liquid. Chemical analysis has shown that there results a pure chemical, which is the desired tetradecylamine-ortho-phenyl-phenate with the following properties:

1. Chemical structure:

$$o\text{-}C_6H_5\text{---}C_6H_4OH.2HNCH_2(CH_2)_{12}CH_3$$

2. Molecular weight: 383
3. Specific gravity at 20° C.: 0.9416
4. Color: Pinkish—darkens when exposed to sunlight
5. Odor: Mild ammoniaceous
6. Appearance: Oily
7. Freezing point: Plus 11° C., forming white crystals.
8. pH—about 9.35
9. Skin irritation: Up to a 3% concentration in patches is not a skin irritant.
10. Toxicity: $LD_{50}$ (lethal dosage)—about 2.0 gr./kg. of body weight. Acute oral toxicity in rats.)
11. Solubility:
    (A) Water—non-soluble
    (B) Aliphatic hydrocarbons incl. paraffin wax—soluble
    (C) Alcohols—soluble
    (D) Glycols—soluble
    (E) Aromatic hydrocarbons—soluble
    (F) Ethers—soluble
    (G) Esters—soluble
    (H) Chlorinated hydrocarbons—soluble.

I have found that the above chemical compound is a highly effective agent for control of bacteria, fungi and other microorganisms.

| | Percent by weight for inhibition | Percent by weight for kill |
|---|---|---|
| Fungicidal efficiencies: | | |
| Aspergillus flavus | 0.006 | 0.008 |
| Chaetopium globosum | 0.003 | 0.004 |
| Hornimiscus gelatinosum | 0.003 | 0.004 |
| Lensites trabea | 0.001 | 0.002 |
| Penicillium digitalum | 0.005 | 0.007 |
| Poria luteofibrata | 0.001 | 0.002 |
| Rhisopus nigricans | 0.005 | 0.006 |
| Trichophyton interdigitale (Athlete's foot fungi) | 0.0004 | 0.0005 |
| Trichophyton rosaceum (Athlete's foot fungi) | 0.0005 | 0.0006 |
| Bactericidal efficiency: | | |
| Eberthella typhosa | 0.002 | 0.004 |
| Corynebacterium diphteriae | 0.003 | 0.004 |
| Escherichia coli | 0.001 | 0.002 |
| Diplococcus phneumoniae | 0.003 | 0.004 |
| Mycobacterium tuberculosum | 0.02 | 0.05 |
| Staphylococcus aureus | 0.003 | 0.005 |
| Salmonella pulorum | 0.002 | 0.004 |
| Streptococcus pyrogenes | 0.003 | 0.004 |
| Streptococcus salvurius | 0.004 | 0.006 |

The above mentioned high fungi- and bacterio-cidal properties of tetradecylamine-orthophenyl-phenate, may be employed for control of disease carrying bacteria and fungi also of microorganisms producing decay or deterioration of organic matter in any conventional manner as in form of mist or spray or dispersion. It can also be applied to a material to be protected in the form of impregnation, coating or printing thereon. The above antimicrobial material acts also as a vapor; thus incorporated in a wrapper, it gives protection to the material through its wrapping.

The compounds may also be incorporated in a powdery solid absorbent such as talc and used as a germicidal dusting agent. The insolubility in water and its good solubility in almost all organic solvents makes the discovered compound a highly desirable fungi- and bacteriocide and disinfectant, in cases where a permanent or fixed fungi- and bactericidal property is to be given to the material which is treated. It can, however, if desired, be formulated as a highly dispersed phase in water, in the presence of an alcohol and a nonionic detergent as dispersants.

APPLICATIONS

*Example of external application to humans and warm-blooded animals against "athlete's foot" and other infectious skin diseasing fungi- and bacteria*

1. (a) As an approximate 1-2% impregnation of the cotton or leather shoe lining or sole-inlay, as well as an impregnation of cork, rubber or felt pads for shoes. The impregnation of the indicated 2% of the antimicrobial chemical can be applied by any conventional manner as by roller-coating, spraying or printing.

(b) As an approximate 0.05-0.2% solution in alcohol for general skin disinfecting purposes.

(c) As an approximate 0.05-0.2% solution in Vaseline, cream or ointment for skin disinfecting purposes.

(d) As an approximate 0.1-.2% by weight in a dusting powder.

*Examples of industrial applications against industrial fungi- and bacteria, causing decay or deterioration of the material*

2. (a) As an approximate 1-2% solution in waxes, asphalt or mineral oils for impregnating or coating with this solution the material which has to be protected against microorganisms' destroying action, such as cardboards, wood, floorings, roofings, fabric, carpets, submerged structures, etc.

(b) As an approximate 1-2% solution in paraffin wax or other wax compositions used for fruit waxing purposes, especially for citrus fruit waxing, thus preventing fruit decay from microorganisms and fungi—in particular from decay by stem-end-rot and penicillium.

(c) As an approximate 0.2-1% impregnation of paper and cotton goods, making them resistant to attack by cellulose destroying fungi- and bacteria.

(d) As an approximate 1-2% solution in water-resistant anti-fouling paints, lacquers and coatings.

(e) Water dispersions of the discovered chemicals should satisfactorily control and inhibit growth of mold and bacteria on walls, ceilings, floors, processing equipment, deodorize and sterilize bath rooms, cabinets, furniture, shelves, trunks, closets, etc. Suggested concentration of the active chemical in the applied formulations from 0.1 to 0.2% by weight.

(f) For sterilizing all kinds of wrappers for sanitary objects such as: respiratory masks of all kinds, drinking straws, adhesive tapes, bandages, brushes, combs, aprons, surgical instruments, drug packages, hand towels, disposable hand towels, sanitary napkins, etc. Suggested impregnation: about 0.2-1% of the chemical by weight.

I wish it to be understood that I do not desire to be limited to the exact details shown and described in this specification, for obvious modifications will occur to a person skilled in the art to which the present invention pertains.

I claim:

1. An antimicrobial compound consisting of an aliphatic primary amine and an aromatic phenol, in which the aliphatic primary amine is tetradecylamine and the aromatic phenol is ortho-phenyl-phenol.

2. A substance for treating materials to impart antimicrobial properties thereto, a mixture of a liquid vehicle and tetradecylamine-ortho-phenylphenate.

JOSEPH WINKLER.

References Cited in the file of this patent

UNITED STATES PATENTS

| Number | Name | Date |
|---|---|---|
| 1,940,817 | Semon | Dec. 26, 1933 |
| 2,004,914 | Wolfe | June 11, 1935 |
| 2,385,719 | Migrdichian | Sept. 25, 1945 |
| 2,389,110 | Cook | Nov. 13, 1945 |
| 2,416,309 | Hansen et al. | Feb. 25, 1947 |
| 2,417,809 | Coleman et al. | Mar. 25, 1947 |
| 2,427,658 | Coleman et al. | Sept. 23, 1947 |
| 2,526,892 | Minich | Oct. 24, 1950 |
| 2,549,358 | Bacon | Apr. 17, 1951 |

FOREIGN PATENTS

| Number | Country | Date |
|---|---|---|
| 436,327 | Great Britain | Sept. 30, 1935 |

OTHER REFERENCES

Weaver et al., "Chemical Studies on Fungicides, Part I, Correlation of Structure With Fungicidity," Navy Dept., ONR, Naval Research Lab., July 19, 1946, particularly pp. 9 and 10.

Underwood, "Overtreatment Dermatitis of the Feet," J. A. M. A., February 2, 1946, vol. 130, No. 5, pp. 249 to 256, especially at page 253, entry "39. Hydrophen . . . Ortho phenyl phenol . . ."

Di Cyan, "Pharmacological Fungicides," Drug and Cosmetic Industry, August 1944, pp. 163 to 169, entry. "o-Phenyl-phenol, Sodium . . . Use: In various mycoses."